United States Patent [19]

Bousquet

[11] 4,414,662
[45] Nov. 8, 1983

[54] SYSTEM FOR THE TRANSMISSION OF DIGITAL DATA IN PACKETS

[76] Inventor: Jean-Claude Bousquet, 97, rue des Morillons, 75015 Paris, France

[21] Appl. No.: 247,170

[22] Filed: Mar. 24, 1981

[30] Foreign Application Priority Data

Apr. 3, 1980 [FR] France ................ 80 07561

[51] Int. Cl.³ .......................... H04L 4/02; H04J 3/00
[52] U.S. Cl. ....................... 370/100; 370/18
[58] Field of Search ............ 370/18, 60, 93, 94, 370/100; 371/70

[56] References Cited

U.S. PATENT DOCUMENTS

| | | | |
|---|---|---|---|
| 3,335,409 | 8/1967 | Heller et al. | 370/100 |
| 3,519,746 | 7/1970 | Gutleber | 370/18 |
| 3,777,062 | 12/1973 | Ogawa | 370/100 |

FOREIGN PATENT DOCUMENTS 1585273  1/1970  France .

OTHER PUBLICATIONS

"Unique Word Detection in Digital Burst Communications", Schrempp et al., IEEE Trans. On Comm. Tech., vol. com-16, Aug. 1968, pp. 597-605.

"The Common TDMA Terminal Equipment for the Telesat TDMA System", Gabbard et al., IEEE Int. Conf. on Comm., Jun. 1975, pp. 19-21.

Primary Examiner—Thomas A. Robinson
Attorney, Agent, or Firm—Pearne, Gordon, Sessions, McCoy, Granger & Tilberry

[57] ABSTRACT

A system for the transmission of digital data in packets comprising transmission and reception means, wherein:

the transmission means are able to form single words taken in a group of words each having 2n bits and constituted by a word $\overline{M}$ of n bits between which are inserted the n bits of the complement word M, the bits of $\overline{M}$ being displaced relative to those of M by a number p of ranks, the choice of p defining a single word of the group;

in the reception means there is only one single word detector and it functions with n bits, said detector being able to detect the displaced appearances of p ranks of words M and $\overline{M}$ on each bit sequence of even rank and uneven rank.

6 Claims, 9 Drawing Figures

SYSTEM FOR THE TRANSMISSION OF DIGITAL DATA IN PACKETS

BACKGROUND OF THE INVENTION

The present invention relates to a system for the transmission of digital data in packets and is used in telecommunications.

In modern satellite communications systems of the time distribution multiple access type (TDMA), the data are transmitted in packets. In order to correctly collect the transmitted data in such systems a receiving earth station must reconstitute different rates or rhythms used in the transmitting station such as the carrier wave frequency and digital timing, whilst also having to identify the start of the packet. Therefore, each packet is preceded by a preamble constituted by a timing recovery sequence followed by a selected combination to facilitate the marking of the start of the packet. This combination is called "single word". The invention more particularly relates to such words and to the means for using them.

The format of the TDMA-type link is illustrated in FIG. 1. The data are inserted into a multiframe system having, for example, sixteen frames numbered 0 to 15. The duration of each multiframe is dependent on the system used and is e.g. 2 ms in the INTELSTAT system. Frame 0 contains reference packets indicating the start of the multiframe and the following frames of the data packets. The structure of these packets is diagrammatically illustrated in FIG. 2.

A packet comprises a preamble followed by data in the case of a data packet. The preamble firstly comprises a bit sequence constituting a carrier and bits timing recovery sequence (SRR). In two state phase modulation this sequence is constituted by a succession of "0" and "1", a "1" indicating a 180° phase jump and a "0" the absence of such a jump.

This timing recovery sequence is followed by a single synchronization word. In a multiframe a particular single word (MU) is used in data packets, this constituting the single data word ($MU_o$). However, one or more single reference words ($MU_{ref}$) can be used in the reference packets starting the multiframe. The preamble is terminated by a service and signalling channel (VSS).

In specifications relating to AMRT systems and particularly in those of the INTELSAT system there are four different single words for distinguishing four packet types. The application of such specifications involves the use of two single word detectors. To facilitate the understanding of the invention this point will be described in greater detail.

A single word detector is generally constituted by a circuit like that of FIG. 3. It comprises a shift register 10 formed by flip-flops 11, 12, 13 etc. with one input and two complementary outputs Q and $\overline{Q}$. One of these outputs is connected to an adder 20. The system of the thus connected outputs corresponds to the complement of the single word to be detected. Thus, if the word is e.g. 10110 the outputs of the flip-flops which are connected to the adder are the outputs $\overline{Q}$ for the first, the output Q for the second, the output $\overline{Q}$ for the third, the output $\overline{Q}$ for the fourth, the output Q for the fifth, etc. The digital signals among which the single word in question is sought are introduced into the shift register 10, where they advance on the occasion of each pulse of a control clock H. When the sought word fills the register all the outputs of the flip-flops connected to the adder 20 supply the latter with a "0" and adder 20 supplies a signal d which is zero. Any other configuration of the word present in the register gives a signal d differing from zero.

Thus, such a circuit supplies a signal which represents the difference between the sought word and the received word. This difference is called the Hamming distance, which is very accurately the number of bits of the same rank which differ in two words or the weight, modulo 2n of the sum of two words of n bits.

This description of single word detectors makes it possible to understand that the use of several different single words involves the use of several detectors, because the connection of the flip-flops of one detector is specific of the word to be detected. However, this is a major disadvantage because such detectors are onerous.

Besides this disadvantage the prior art system has two further disadvantages linked with the fact that in practice there are possible packet locating errors. Thus, the differential decoding or demodulation generally used has the effect of greatly correlating the errors on the bits of adjacent symbols, whilst the errors are independent of bits spaced by more than one symbol. It is difficult to find a single word such that it and its complement, each preceded by the same timing recovery sequence have an optimum autocorrelation function.

BRIEF SUMMARY OF THE INVENTION

The object of the present invention is to solve all these problems. To this end it proposes the use of a single word of 2n bits constituted by two single words of n bits which are interlaced and shifted. The single word detector used is able to process words of n bits and it alternately receives the sequence of bits of uneven rank and even rank of the word of 2n bits.

In this way the invention leads to the following advantages compared with the prior art systems:
one single word detector makes it possible to detect several different single words (as a function of the shift of the elementary words forming it);
one n bit single word detector makes it possible to detect a single word of 2n bits;
the intercorrelation function of the single word in the preamble is improved because the single word detector processes every other symbol;
each single word of n bits is formed on rank symbols of the same parity in such a way that the errors on the bits are independent.

More specifically the present invention relates to a system for the transmission of digital data in packets, comprising:
transmission means able to form packets comprising a preamble formed more particularly from a timing recovery bit sequence followed by a combination of bits called a single word;
reception means more particularly comprising a decoder able to detect the presence of a single word in the signals received; wherein:
(A) the transmission means are able to form single words taken in a group of words each having 2n bits and constituted by a word M of n bits between which are inserted the n bits of the complement word $\overline{M}$, the bits of $\overline{M}$ being displaced relative to those of M by a number p of ranks, the choice of p defining a single word of the group;
(B) in the reception means there is only one single word detector and it functions with n bits, said detector being able to detect the displaced appearances of p ranks of words M and $\overline{M}$ on each bit sequence of even rank and uneven rank.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
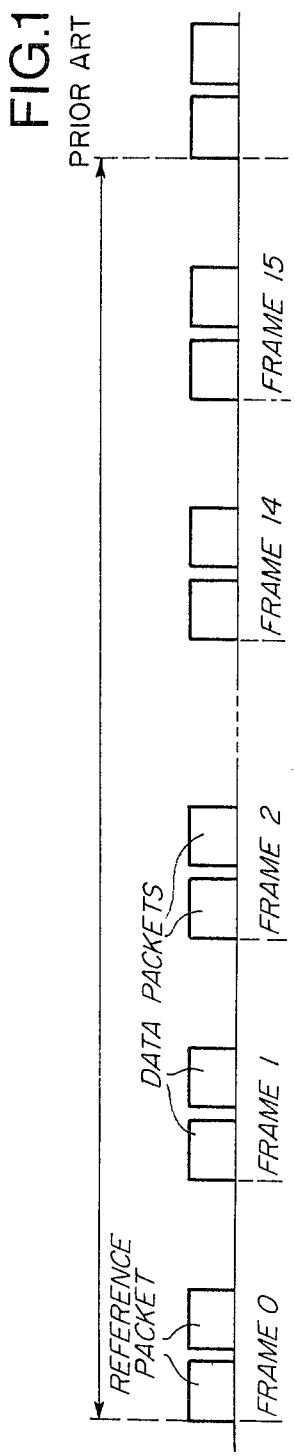
FIG. 1 a diagram illustrating the format of a conventional TDMA-type link used in the telemetry field.
Figure 2:
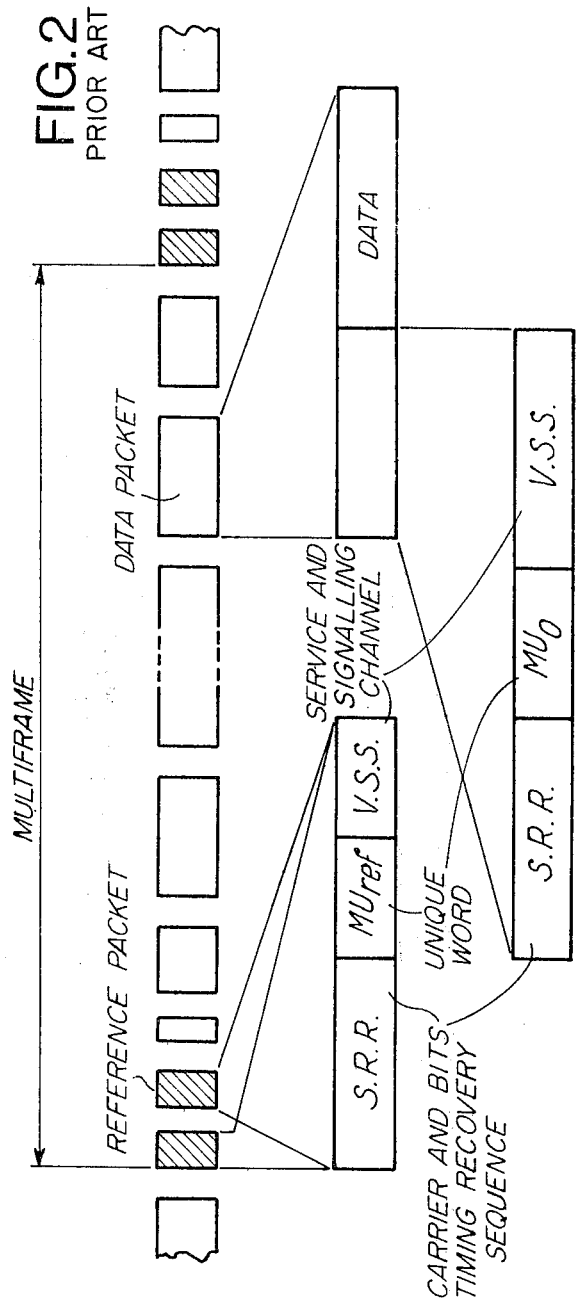
FIG. 2 a diagram illustrating the structure of the reference packet and data packets shown in FIG. 1.
Figure 3:
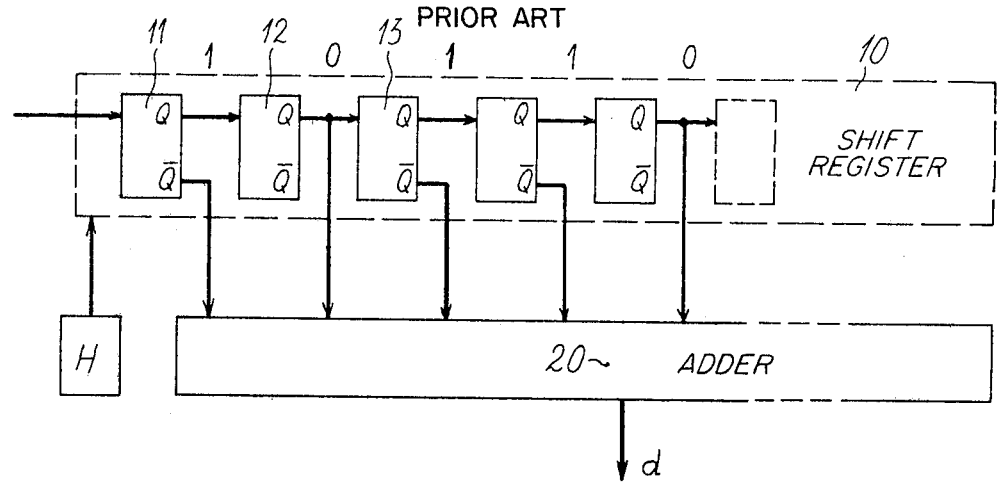
FIG. 3 a diagram illustrating a single word detector circuit of the type used in the telemetry field.
Figure 4:
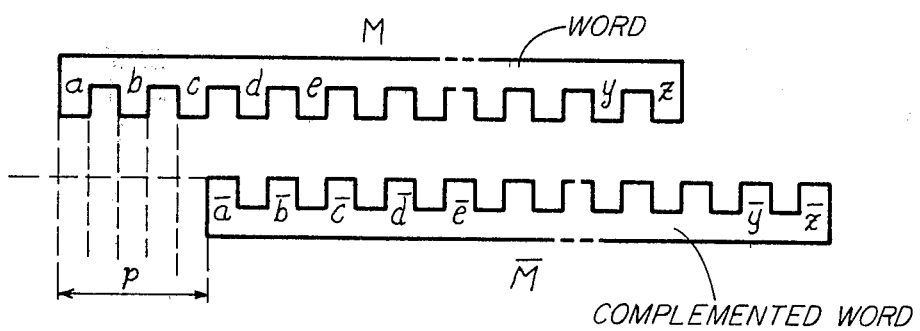
FIG. 4 diagrammatically the structure of a single word according to the invention.

FIG. 4 shows the structure of a single word of 2n bits according to the invention. Such a word is constituted by a word M of form:

a, b, c ... y, z interlaced with the complement word $\overline{M}$ of form:

$\overline{a}, \overline{b}, \overline{c} \overline{y}, \overline{z}$ each of the letters indicating a bit equal to 0 or 1. There can be a random displacement between two words and it is equal to a number p of periods T of the binary signal.

Thus, for a displacement of one period, the single word with 2n bits is written:

a $\overline{a}$ b $\overline{b}$ c $\overline{c}$ ... y $\overline{y}$ z $\overline{z}$, word designated $(\overline{M}, M)$ or in the equivalent complement form:

$\overline{a}$ a $\overline{b}$ b $\overline{c}$ c ... $\overline{y}$ y $\overline{z}$ z, word designated $(\overline{M}, M)$.

These words are respectively associated with the normal and complement timing recovery sequences which, in two state phase modulation (MDP2) are of the general form:

0 1 0 1 0 1 ... 0 1 0 1 0 1 sequence designated (0, 1)
or complement form:

1 0 1 0 1 0 ... 1 0 1 0 1 0 sequence designated (1, 0).

These single words have the following advantages:
the alternation of adjacent bits (a, $\overline{a}$) is favourable to maintaining the timing, which is particularly useful at the start of the packet;
for a single word of 2n bits a single word detector of n bits is sufficient if this detector sees the alternate passage of the bit sequences of even rank and uneven rank, namely in the considered example:

0 0 0 0 ... 0 0 0 0, $\overline{abc}$ ... $\overline{yz}$ sequence designated (0, $\overline{M}$), and:
1 1 1 1 ... 1 1 1 1, abc ... yz sequence designated (1, M);

if the selected single word (0,M) has an adequate performance level, it is certain that the associated single word (1, $\overline{M}$) has the same performance levels, which is rarely the case for the other pairs (0, $\overline{M}$) and (1, M);

the n bits are often sufficient for tracking the single word in a window of several bits with several errors—the 2n bits only become necessary during an investigation of the single word without error in a wide window in the presence of noise;

if (M, $\overline{M}$) is the single word chosen for the reference station ($\overline{M}$, M) will be the single word for the other stations, in which case a single detector is sufficient for the investigation and tracking of these two single words;

this type of single word can be used in the case of a transmission in MDP2 and no matter whether the reception is of the differential demodulation type or the coherent demodulation type followed by differential decoding.

As for the word M of n bits chosen for constituting the single word with 2n bits, it is advantageously formed by a pseudo-random sequence. It is known that such sequences can be produced from special polynomials and specifically by shift registers which are appropriately relooped on themselves. For example on the basis of the order sequence 4:

1 1 1 1 and the polynomial of degree 4: $x^3 + x^4$ the following pseudo-random sequence S is produced:
S: . 1 1 1 1 0 0 0 1 0 0 1 1 0 1 0 . 1 1 1 1 ...

and the complement sequence $\overline{S}$:
$\overline{S}$: . 0 0 0 0 1 1 1 0 1 1 0 0 1 0 1 . 0 0 0 0

On the basis of one of these sequences it is possible to form a single word M (and its complement) by starting it at a random point of the sequence. Preferably the sequence is started in such a way that the first bits extend the timing recovery sequence. Thus, it is possible to adopt the following word M by sampling the bits from right to left in the sequence S, which classifies them in their transmission and reception order:

M = 0 1 0 1 0 0 1 1 0 1 1 1 0 0 0 0

The complement word is then:

$\overline{M}$ = 1 0 1 0 1 1 0 0 1 0 0 0 1 1 1 1

For the remainder of the description it is assumed that word M is used, without this in any way limiting the invention. The overall single word then comprises 2 × 16 = 32 bits.

Before studying the performances of the single words according to the invention it is pointed out in general terms that the performances of a single word are characterized by:
the probability $P_1$ of non-detection when it is transmitted;

the probability $P_2$ of anticipated incorrect detection when it is transmitted;

the probability $P_3$ of incorrect detection in the noise when it is not transmitted for different error rates for each bit in the transmission channel, said rate varying in general from $10^{-2}$ to $10^{-6}$.

Standard considerations in this field, which can be gathered from the present description, make it possible to calculate or at least evaluate these different probabilities.

It is merely pointed out that a single word detector calculates the Hamming distance d from the received code to the expected code (M) or complement code ($\overline{M}$) and that k errors can be accepted. In general terms the decision criteria are as follows:

if $d \leq k$, it is decided that M has been transmitted and found, if $d \geq n = k$, it is decided that M has been transmitted and found, if $k < d < n$, it is decided that M and $\overline{M}$ have not been found.

In differential demodulation or coherent demodulation followed by differential decoding the errors on adjacent bits are correlated and the errors on even or uneven bits are independent.

The performances of the single words according to the invention are now described in the case of an ordinary station and then in the case of a reference station.

(1) Ordinary Station

The preamble of an ordinary station Sn is successively constituted by:

a timing recovery sequence:

101010...101010 of a length equal to a multiple of sixteen bits;
a single word $MU_o$ of $2 \times 16$ bits of the form ($\overline{M}$, M):

10.01.10.01.10.10.01.01.10.01.01.01.10.10.10.10.

The single word detector determines the distance d from the expected code (M) to the received code alternately on the even and uneven bits followed by the data (X), i.e. respectively:

111...111,1010110010001111,XXX
...

and

000...000,0101001101110000,XXX
...

Figure 5:
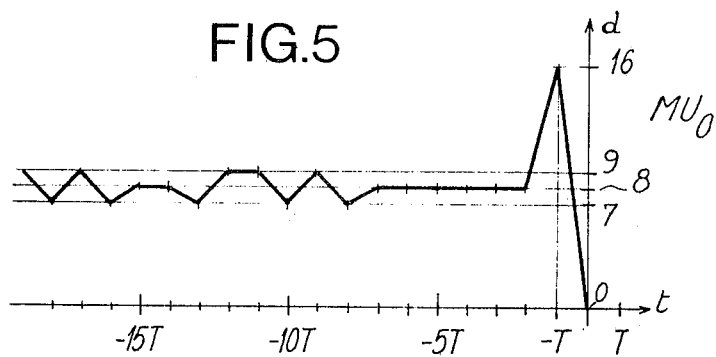
FIG. 5 the variations in the Hemming distance between a received word and a single data word $MU_o$ according to the invention.

The distance d from the expected single word M to the transmitted single word displaced by n bits is given in FIG. 5 where the displacement, plotted on the abscissa, is expressed in periods T.

The performances of this single word differ as a function of whether the TDMA terminal is or is not in the synchronized mode:

(a) Performances in the non-synchronized mode:

During the acquisition phase the single word of the local station is investigated in a wide window and no error is accepted (k=0) among the 32 bits.

The probability $P_3$ of incorrect detection in the noise is:

$$P_3: \frac{1}{2^{32}} = 2.3 \ 10^{-10}$$

The single word detector decides that the local single word is found without error if successively:

d=16 then d=0 in accordance with FIG. 5.

The probability $P_1$ of non-detection of the single word without error is given for different error rates per bit in the attached Table I.

(b) Performances in the synchronized mode

Once synchronization and acquisition have taken place the single word of the local station and those of the remote stations are investigated in the windows of a few bits about the nominal positions.

The single word detector decides that the single word of an ordinary station is found with at the most four errors among the sixteen bits if $d \leq 4$.

The probabilities $P_1$ of non-detection of the single word and $P_2$ of anticipated incorrect detection for a given position are given for different error rates per bit in the following Table II.

(2) Reference Station

The preamble of the reference station is successively constituted by:

a timing recovery sequence:

010101...010101 of a length equal to a multiple of sixteen bits;
a first single reference word ($MU_{ref1}$) of $2 \times 16$ bits of form (M, $\overline{M}$):

01.10.01.10.01.01.10.10.01.10.10.01.01.01.01

The single word detector determines the distance d from the expected code (M):

M=0101001101110000 to the received code alternately on the even and uneven bits, followed by the data (X):

000...000,0101001101111000.XXX..

and

111...111,1010110010001111.XXX..

Figure 6:
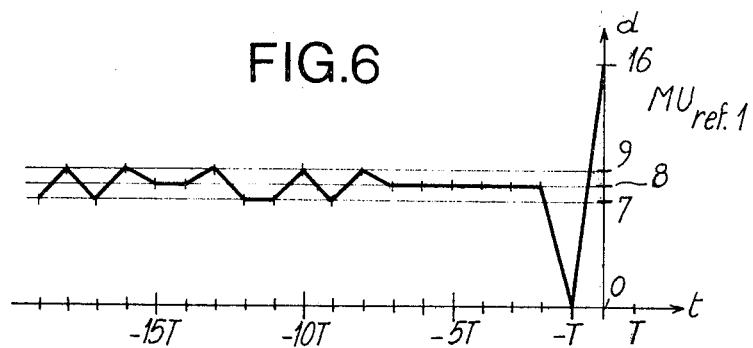
FIG. 6 the variations in the Hamming distance between a received word and a first single reference word $MU_{ref1}$ according to the invention.

The distance d from the expected single word M to the transmission single word displaced by n bits is given by FIG. 6.

As for the preceding word, the performances of the single reference word differ as a function of whether the TDMA terminal is or is not in the synchronized mode:

(a) Performance in the non-synchronized mode

During the synchronization phase the single word of the reference station is investigated throughout the frame. No error is allowed (k=0) on 32 bits. The probability $P_3$ of incorrect detection in the noise is:

$$P_3 = \frac{1}{2^{32}} = 2.3 \ 10^{-10}$$

The single word detector decides that the single reference word is found without error if successively:

$d=0$ then $d=16$ in accordance with FIG. 6.

The probability $P_1$ of non-detection of the single word without error is given for the different error rates per bit in the attached Table III.

(b) Performances in the synchronized mode

Once synchronization has taken place the single word of the reference station is investigated in a window of a few bits around the nominal position.

The single word detector decides that the single reference word is found with at the most four errors among the sixteen bits if $d \geq 12$.

The probabilities $P_1$ of non-detection of the single word and $P_2$ of anticipated incorrect detection for a given position are provided for different error rates per bit in the attached Table IV.

Figure 7:
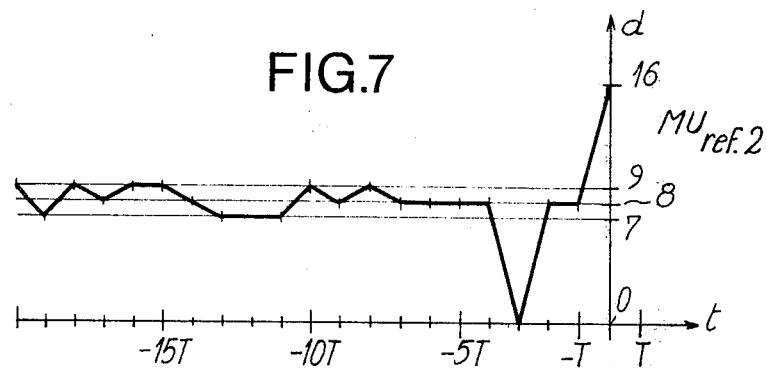
FIG. 7 the variations in the Hamming distance between a received word and a second single reference word $MU_{ref2}$ according to the invention.

A second single reference word ($MU_{ref2}$) can be obtained by displacing the word $\overline{M}$ by three periods relative to M. The Hamming distance d then varies in the manner shown in FIG. 7. In the non-synchronized mode this second reference word will be considered as transmitted and found if, successively, $d=0$ then $d=16$ three periods later.

In the synchronized mode this word will be considered as found with four errors or less if $d \geq 12$.

Figure 8:
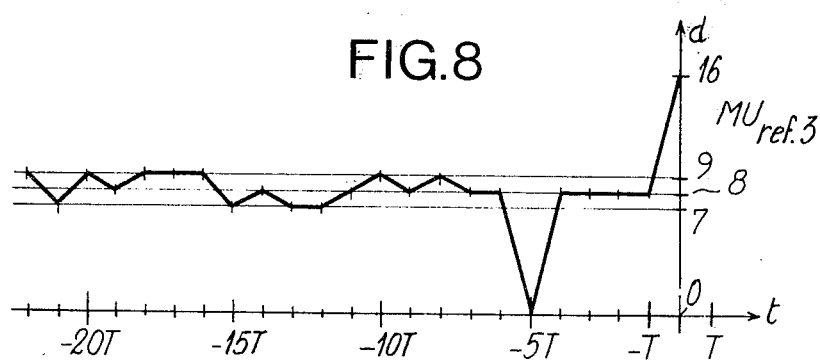
FIG. 8 the variations in the Hamming distance between a received word and a third single reference word $MU_{ref3}$ according to the invention.

A third single reference word $MU_{ref3}$ can be obtained by displacing the word $\overline{M}$ by five periods relative to H. The Hamming distance d then varies as represented in FIG. 8.

In the non-synchronized mode this third reference word will be considered as transmitted and found if, successively, $d=0$ then $d=16$ five periods later.

In the synchronized mode it will be considered as found with three errors or less if $d \geq 12$.

Other reference words can be formed in accordance with the same principle.

Figure 9:
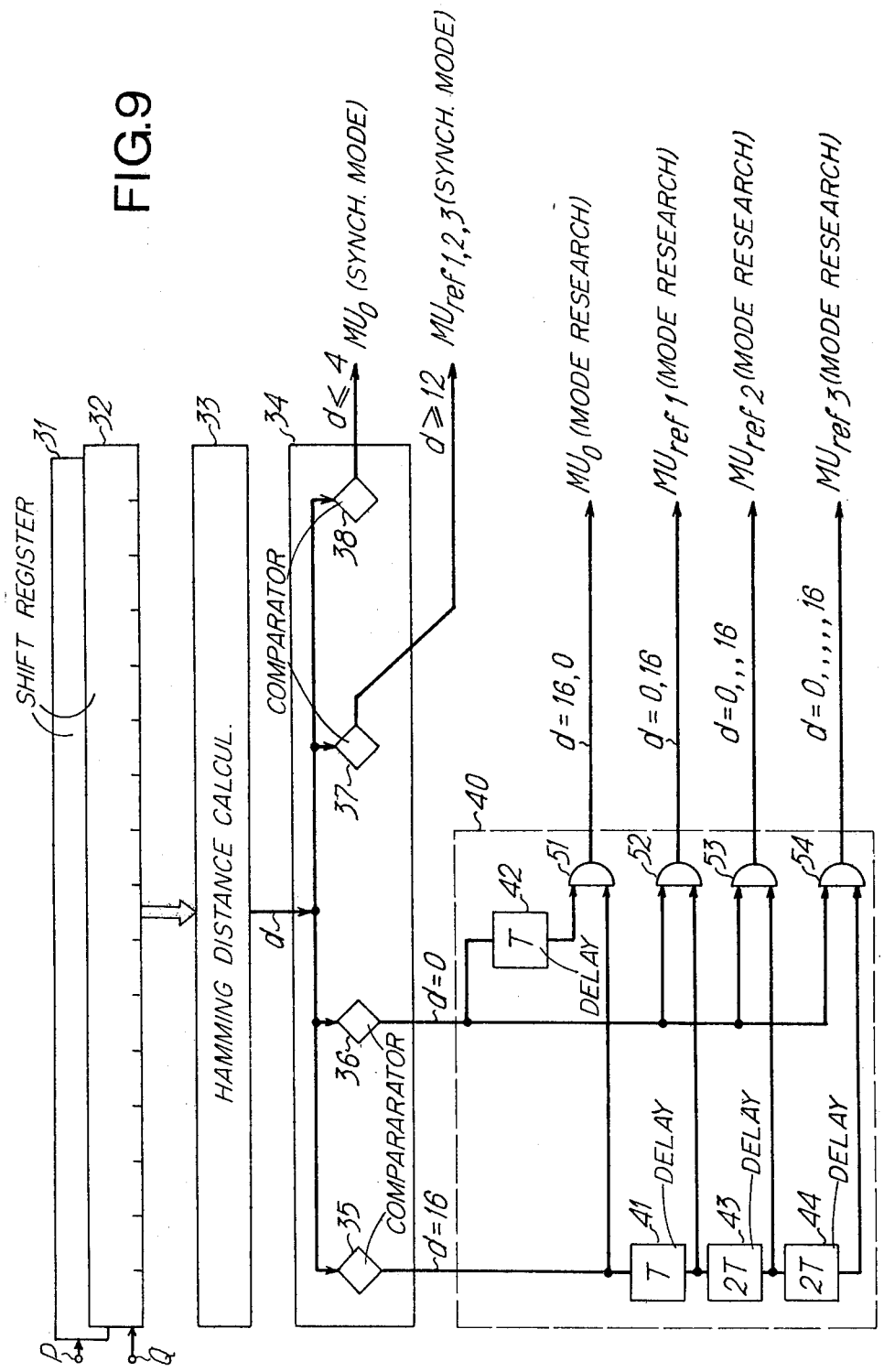
FIG. 9 a block diagram of a single word detector according to the invention.

The means making it possible to use these words according to the invention are shown in FIG. 9. The circuit shown comprises a double shift register 31, 32 receiving the bit trains of even rank (P) and uneven rank (Q), a circuit 33 for calculating the Hamming distance d, a circuit 34 formed by comparators 35, 36, 37, 38 respectively at 0, 4, 12 and 16, a circuit 40 formed by delay cells of 1 period (T) 41 and 42, delay cells of 2 periods (2T) 43 and 44 and logic AND gates 51, 52, 53 and 54.

The circuit operates in the following manner. The digital signal split up in accordance with known means into a train P of even bits and a train Q of uneven bits enters the double shift register 31-32 in such a way that circuit 34 sees the alternate passage of the even and uneven sequences referred to hereinbefore. The Hamming distance d starts to oscillate between values 7 and 9 as indicated in the diagrams of FIGS. 5 to 8. Then when the word M fills one or other of the half-registers 31 or 32, distance d drops suddenly to 0, then rises to the value 16 when the word M fills the other half-register. The circuit 34 supplies signals indicating the times at which these events appear.

Thus, the appearance of $d=16$ followed after a period by $d=0$ leads to the appearance of two signals at the input of the AND gate 51, which then supplies at its output a signal marking the detection of the single data word $MU_o$ when in the investigated mode and as described hereinbefore.

The appearance of $d=0$, then $d=16$ corresponds to the detection of the first reference word $MU_{ref1}$ in the investigated mode, which is indicated to the output of gate 52.

In the same way the output of gate 53 indicates the detection of $MU_{ref2}$ and that of 54 the detection of $MU_{ref3}$, always in the sought mode.

The detections in the synchronized mode are indicated on the output connections of the comparators at 4 (for $MU_o$) and at 12 for $MU_{ref1}$.

In addition to the advantages referred to hereinbefore the use of the single word according to the invention prevents ambiguity in the case of a four-state phase modulation (MDP4). Thus, the order in which the Hamming distance on each even or uneven train passes through the values 0 and 2n makes it possible to eliminate phase ambiguity between two carriers corresponding to these two trains.

TABLE I

| Error rate/bit | $10^{-1}$ | $3 \cdot 10^{-2}$ | $10^{-2}$ | $10^{-3}$ | $10^{-4}$ | $10^{-5}$ | $10^{-6}$ |
|---|---|---|---|---|---|---|---|
| $P_1$ with coherent demodulation | 0.97 | 0.62 | 0.28 | $3.2 \cdot 10^{-2}$ | $3.2 \cdot 10^{-3}$ | $3.2 \cdot 10^{-4}$ | $3.2 \cdot 10^{-5}$ |
| with differential demodulation | 0.82 | 0.39 | 0.15 | $1.6 \cdot 10^{-2}$ | $1.6 \cdot 10^{-3}$ | $1.6 \cdot 10^{-4}$ | $1.6 \cdot 10^{-5}$ |

TABLE II

| Error rate/bit | $10^{-1}$ | $3 \cdot 10^{-2}$ | $10^{-2}$ | $10^{-3}$ | $10^{-4}$ | $10^{-5}$ | $10^{-6}$ |
|---|---|---|---|---|---|---|---|
| $P_1$ | $1.7 \cdot 10^{-2}$ | $8.1 \cdot 10^{-5}$ | $4.0 \cdot 10^{-7}$ | $4.3 \cdot 10^{-12}$ | $4.4 \cdot 10^{-17}$ | $4.4 \cdot 10^{-22}$ | $4.4 \cdot 10^{-27}$ |
| $P_2$ | $2.1 \cdot 10^{-3}$ | $4.0 \cdot 10^{-5}$ | $6.2 \cdot 10^{-7}$ | $6.9 \cdot 10^{-11}$ | $7.0 \cdot 10^{-15}$ | $7.0 \cdot 10^{-19}$ | $7.0 \cdot 10^{-23}$ |

TABLE III

| Error rate/bit | $10^{-1}$ | $3 \cdot 10^{-2}$ | $10^{-2}$ | $10^{-3}$ | $10^{-4}$ | $10^{-5}$ | $10^{-6}$ |
|---|---|---|---|---|---|---|---|
| $P_1$ with coherent demodulation | 0.97 | 0.62 | 0.28 | $3.2 \cdot 10^{-2}$ | $3.2 \cdot 10^{-3}$ | $3.2 \cdot 10^{-4}$ | $3.2 \cdot 10^{-5}$ |
| with differential modulation | 0.82 | 0.39 | 0.15 | $1.6 \cdot 10^{-2}$ | $1.6 \cdot 10^{-3}$ | $1.6 \cdot 10^{-4}$ | $1.6 \cdot 10^{-5}$ |

TABLE IV

| Error rate/bit | $10^{-1}$ | $3 \cdot 10^{-2}$ | $10^{-2}$ | $10^{-3}$ | $10^{-4}$ | $10^{-5}$ | $10^{-6}$ |
|---|---|---|---|---|---|---|---|
| $P_1$ | $1.7 \cdot 10^{-2}$ | $8.1 \cdot 10^{-5}$ | $4.0 \cdot 10^{-7}$ | $4.3 \cdot 10^{-12}$ | $4.4 \cdot 10^{-17}$ | $4.4 \cdot 10^{-22}$ | $4.4 \cdot 10^{-27}$ |

TABLE IV-continued

| Error rate/bit | $10^{-1}$ | $3 \cdot 10^{-2}$ | $10^{-2}$ | $10^{-3}$ | $10^{-4}$ | $10^{-5}$ | $10^{-6}$ |
| --- | --- | --- | --- | --- | --- | --- | --- |
| $P_2$ | $2.1 \cdot 10^{-3}$ | $4.0 \cdot 10^{-5}$ | $6.2 \cdot 10^{-7}$ | $6.9 \cdot 10^{-11}$ | $7.0 \cdot 10^{-15}$ | $7.0 \cdot 10^{-19}$ | $7.0 \cdot 10^{-23}$ |

What is claimed is:

1. A system for the transmission of digital data in packets, comprising:
transmission means able to form packets comprising a preamble formed more particularly from a timing recovery bit sequence followed by a combination of bits called a single word;
reception means more particularly comprising a decoder able to detect the presence of a single word in the signals received;
wherein:
(A) the transmission means is able to form single words taken in a group of words each having 2n bits and constituted by a word M of n bits between which are inserted the n bits of the complement word $\overline{M}$, the bits of $\overline{M}$ being displaced relative to those of M by a number n of ranks, the choice of p defining the single word of the group;
(B) in the reception means there is only one single word detector and it functions with n bits, said detector being able to detect the displaced appearances of p ranks of words M and $\overline{M}$ on each bit sequence of even rank and uneven rank.

2. A system according to claim 1, wherein the single word detector comprises:
(a) first means with n bits for calculating the Hamming distance d between the received word and the expected word M;
(b) a double shift register for alternately passing to the said first means the bits of uneven rank and of even rank of the received word;
(c) a comparison circuit comprising:
a comparator of d and n with an output indicating if d=n,
a comparator of d and 0 with an output indicating if d=0,
a comparator of d and n-k, k being an accepted number of errors, with an output indicating if d≧n-k,
a comparator of d and k with an output indicating if d≦k.

3. A digital data transmission system according to claim 1, wherein the word M of n bits is formed by a pseudo-random sequence of bits.

4. A digital data transmission system according to claim 1, wherein the transmission means use a two or four state phase modulation and the reception means a differential modulation or a coherent demodulation formed by a differential decoding.

5. A digital data transmission system according to claim 1, wherein the single word detector is able to operate according to one of the two following modes:
sought or non-synchronized mode for which the number of accepted errors k is zero,
synchronized mode which follows the sought mode for which k≠0.

6. A digital data transmission system according to claim 1, comprising a reference station and ordinary stations, wherein the reference station is designed to work with one of the single reference words of form ($\overline{M}$, M) and the ordinary stations to work with a single data word of form ($\overline{M}$, M).

* * * * *

UNITED STATES PATENT AND TRADEMARK OFFICE
CERTIFICATE OF CORRECTION

PATENT NO. : 4,414,662

DATED : November 8, 1983

INVENTOR(S) : Jean-Claude Bousquet

It is certified that error appears in the above-identified patent and that said Letters Patent are hereby corrected as shown below:

ABSTRACT

Line 5, "$\overline{M}$" should be --$\underline{M}$--.
Line 7, "M" should be --$\overline{M}$--.

Column 3, line 17, "Hemming" should be --Hamming--.
Column 3, line 50, "($\overline{M}$, M)" should be --(M, $\overline{M}$)--.
Column 4, line 4, "$\overline{a}\,\overline{b}\,\overline{c}$ . . . $\overline{y}\,\overline{z}$" should be --abc . . . yz--.
Column 4, line 5, "$\overline{M}$" should be --M--.
Column 4, line 8, "abc . . . yz" should be --$\overline{a}\,\overline{b}\,\overline{c}$ . . . $\overline{y}\,\overline{z}$--.
Column 4, line 8, "M" should be --$\overline{M}$--.
Column 5, line 20, "M" (first occurrence) should be --$\overline{M}$--.
Column 5, line 22, "M" (second occurrence) should be --$\overline{M}$--.
Column 6, line 52, "transmission" should be --transmitted--.
Column 7, line 28, "H" should be --$\underline{M}$--.
Column 8, line 15, "M" should be --$\overline{M}$--.

Signed and Sealed this

Fifth Day of June 1984

[SEAL]

Attest:

GERALD J. MOSSINGHOFF

Attesting Officer   Commissioner of Patents and Trademarks